(12) United States Patent
Oh et al.

(10) Patent No.: US 9,570,239 B2
(45) Date of Patent: Feb. 14, 2017

(54) ELECTRODE FORMING FILM AND FILM CAPACITOR USING THE SAME

(71) Applicant: SAMHWA CAPACITOR CO., LTD., Yongin-si (KR)

(72) Inventors: Young Joo Oh, Seoul (KR); Soo Hwi Lee, Suwon-si (KR); Kyung Min Lee, Paju-si (KR); Young Jun Jo, Gangneung-si (KR)

(73) Assignee: SAMHWA CAPACITOR CO., LTD. (KR)

( * ) Notice: Subject to any disclaimer, the term of this patent is extended or adjusted under 35 U.S.C. 154(b) by 101 days.

(21) Appl. No.: 14/683,388

(22) Filed: Apr. 10, 2015

(65) Prior Publication Data

US 2016/0064147 A1    Mar. 3, 2016

(30) Foreign Application Priority Data

Sep. 2, 2014 (KR) .................. 10-2014-0116190
Mar. 31, 2015 (KR) .................. 10-2015-0045472

(51) Int. Cl.
| | |
|---|---|
| *H01G 4/015* | (2006.01) |
| *H01G 4/32* | (2006.01) |
| *H01G 4/40* | (2006.01) |
| *H01G 4/005* | (2006.01) |
| *H01G 4/14* | (2006.01) |
| *H01G 4/012* | (2006.01) |
| *H01G 4/33* | (2006.01) |

(52) U.S. Cl.
CPC .............. *H01G 4/40* (2013.01); *H01G 4/005* (2013.01); *H01G 4/012* (2013.01); *H01G 4/015* (2013.01); *H01G 4/14* (2013.01); *H01G 4/33* (2013.01)

(58) Field of Classification Search
CPC ............. H01G 2/16; H01G 4/015; H01G 4/32
USPC .............................. 361/273, 301.5
See application file for complete search history.

(56) References Cited

U.S. PATENT DOCUMENTS

| | | | | |
|---|---|---|---|---|
| 5,136,462 A | * | 8/1992 | Steiner | H01G 4/015 29/25.42 |
| 5,905,628 A | * | 5/1999 | Okuno | H01G 4/012 29/25.42 |
| 6,094,337 A | * | 7/2000 | Ueda | C08J 5/18 361/311 |
| 6,111,743 A | * | 8/2000 | Lavene | H01G 4/012 29/25.42 |

(Continued)

FOREIGN PATENT DOCUMENTS

KR    100836567    6/2008

*Primary Examiner* — Eric Thomas
(74) *Attorney, Agent, or Firm* — Cantor Colburn LLP

(57) ABSTRACT

An electrode forming film includes: a dielectric film; an electrode head part; a first common electrode connected with the electrode head part; a plurality of first split electrodes spaced apart from the first common electrode in the first direction; a second common electrode spaced apart from the first split electrodes in the first direction; a plurality of second split electrodes spaced apart from the second common electrode in the first direction; a plurality of first fuse parts formed between the first common electrode and the first split electrodes; a plurality of second fuse parts formed between the first split electrodes and the second common electrode; and a plurality of third fuse parts formed between the second common electrode and the second split electrodes.

18 Claims, 9 Drawing Sheets

(56) References Cited

U.S. PATENT DOCUMENTS

| | | | |
|---|---|---|---|
| 6,370,008 B1* | 4/2002 | Vetter | H01G 4/015 361/273 |
| 6,407,905 B1* | 6/2002 | Connolly | H01G 4/012 361/273 |
| 2006/0050467 A1* | 3/2006 | Shiota | H01G 2/16 361/303 |
| 2008/0278888 A1* | 11/2008 | Yang | H01G 2/16 361/323 |
| 2011/0181998 A1* | 7/2011 | Yang | H01G 2/16 361/275.4 |
| 2012/0002346 A1* | 1/2012 | Takagaki | H01G 4/012 361/301.4 |

\* cited by examiner

ELECTRODE FORMING FILM AND FILM CAPACITOR USING THE SAME

BACKGROUND OF THE INVENTION

1. Field of the Invention

The present invention relates to an electrode forming film and a film capacitor using the same, and more particularly, to an electrode forming film and a film capacitor using the same which can minimize reduction of capacity due to an operation of fuse parts.

2. Description of the Related Art

A film capacitor is used as a DC link for stabilizing voltage in an inverter circuit system, a filter for removing a ripple current or a snubber capacitor for absorbing a surge voltage. Such a film capacitor includes an electrode forming film. The electrode forming film has a self-healing characteristic by forming a metal pattern on the surface of a dielectric substance. When dielectric breakdown occurs to the dielectric substance, the self-healing characteristic of the electrode forming film protects the film capacitor by heating and evaporating the metal pattern deposited at the area where dielectric breakdown occurred. Korean Patent No. 836567 discloses the relevant technology.

Korean Patent No. 836567 relates to a metalized plastic film for a film capacitor including split electrode parts and fuse parts. The split electrode parts are formed in a long rectangle within a range of one fourth to three fourths of the width of the film from the margin part of one side, where metal for the electrode is not deposited, toward the other side of the width direction of the film. The fuse parts are formed at one point of an area which is within a range from the split electrode of an end of the margin part to a portion which comes into contact with the metal for the electrode to have a pattern which is continuously formed at regular intervals in the longitudinal direction of the film.

The conventional electrode forming film disclosed in Korean Patent No. 836567 has a problem in that the split electrode part connected to the fuse part becomes open and the area of the electrode forming film is reduced to reduce capacity of the film capacitor when the fuse part is operated and evaporated due to dielectric breakdown. Moreover, the conventional electrode forming film has another problem in that, because the fuse parts are arranged side by side in a straight line, in a case that the fuse parts are operated and evaporated, it may influence on the neighboring fuse parts and interrupt a normal operation of the fuses.

SUMMARY OF THE INVENTION

Accordingly, the present invention has been made to solve the above-mentioned problems occurring in the prior arts, and it is an object of the present invention to provide an electrode forming film and a film capacitor using the same which can minimize reduction of capacity due to an operation of fuse parts.

It is another object of the present invention to provide an electrode forming film and a film capacitor using the same which can prevent that the fuse parts influence on the neighboring fuse parts and are operated abnormally when the fuse parts are operated and evaporated because the fuse parts are formed to be at cross to each other.

It is a further object of the present invention to provide an electrode forming film and a film capacitor using the same which can maintain security and reduce resistance of the electrode forming film so as to minimize heat generation when a load is applied because areas of segment electrodes connected with the fuse parts are arranged in different positions.

To accomplish the above object, according to the present invention, there is provided an electrode forming film including: a dielectric film; an electrode head part formed on the upper surface of the dielectric film; a first common electrode formed on the upper surface of the dielectric film to be connected with the electrode head part; a plurality of first split electrodes which are spaced apart from the first common electrode on the upper surface of the dielectric film in the first direction and are spaced apart from each other in the second direction at right angles to the first direction; a second common electrode formed to be spaced apart from the first split electrodes on the upper surface of the dielectric film in the first direction; a plurality of second split electrodes which are spaced apart from the second common electrode on the upper surface of the dielectric film in the first direction and are spaced apart from each other in the second direction; a plurality of first fuse parts which are formed between the first common electrode and the first split electrodes to make electric current, which flows in and out through the electrode head part, flow to the first common electrode and the first split electrodes; a plurality of second fuse parts which are formed between the first split electrodes and the second common electrode to make electric current, which flows into and out of the first common electrode flow to the first split electrodes and the second common electrode; and a plurality of third fuse parts which are formed between the second common electrode and the second split electrodes to make electric current, which flows into and out of the first split electrodes flow to the second common electrode and the second split electrodes.

In another aspect of the present invention, there is provided a film capacitor including: at least two electrode forming films each of which includes a dielectric film on which an electrode head part, a first common electrode, a plurality of first split electrodes, a second common electrode, a plurality of second split electrodes, a plurality of first fuse parts, a plurality of second fuse parts and a plurality of third fuse parts are arranged on the upper surface thereof to be spaced apart from each other; and a pair of external electrodes each of which is connected with the electrode head part of the electrode forming film, wherein the electrode head parts of the at least two electrode forming films are located at one side and the other side to be at cross to each other, the first common electrode and the second split electrodes are piled one on another and the second common electrode and the first split electrodes are piled one on another to be overlapped, one of the external electrodes is connected with the electrode head part located at one side of the electrode forming film and the other one is connected with the electrode head part located at the other side of the electrode forming film.

According to the present invention, the electrode forming film and the film capacitor using the same can minimize reduction of capacity due to an operation of fuse parts, and prevent that the fuse parts influence on the neighboring fuse parts and are operated abnormally when the fuse parts are operated and evaporated because the fuse parts are formed to be at cross to each other.

Additionally, the electrode forming film and the film capacitor using the same can maintain security and reduce resistance of the electrode forming film so as to minimize heat generation when a load is applied because areas of segment electrodes connected with the fuse parts are arranged in different positions.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
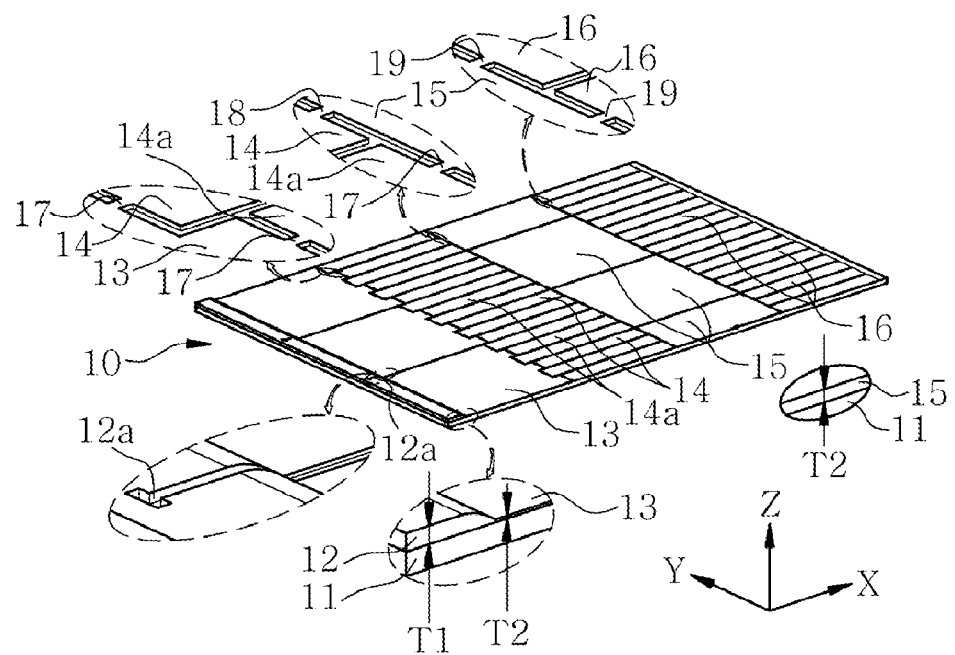
FIG. 1 is a perspective view of an electrode forming film according to a preferred embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, referring to the attached drawings, preferred embodiments of an electrode forming film and a film capacitor using the same will be described.

Figure 2:
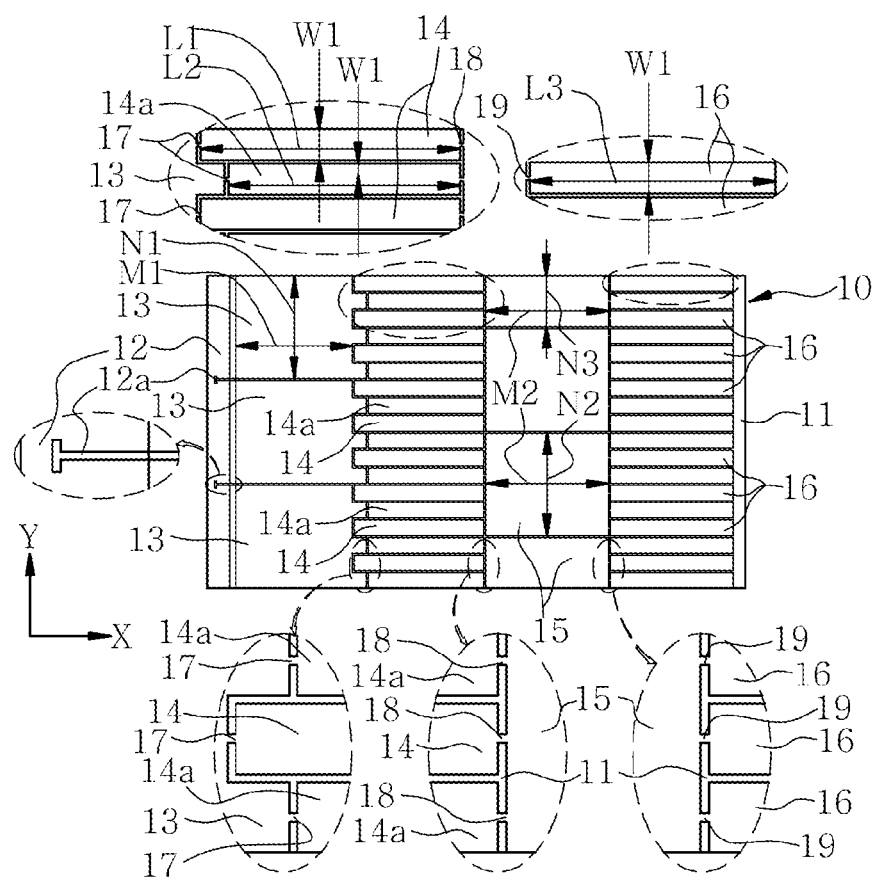
FIG. 2 is a plan view of the electrode forming film shown in FIG. 1.

As shown in FIGS. 1 and 2, the electrode forming film 10 according to a preferred embodiment of the present invention includes a dielectric film 11, an electrode head part 12, a first common electrode 13, a plurality of first split electrodes 14 and 14a, a second common electrode 15, a plurality of second split electrodes 16, a plurality of first fuse parts 17, a plurality of second fuse parts 18 and a plurality of third fuse parts 19.

The dielectric film 11 generally supports the electrode forming film 10 according to the present invention, and the electrode head part 12 is formed on the upper surface of the dielectric film 11. The first common electrode 13 is formed on the upper surface of the dielectric film 11 to be connected with the electrode head part 12, and the first split electrodes 14 and 14a are spaced apart from the first common electrode 13 on the upper surface of the dielectric film 11 in the first direction (X) and spaced apart from each other in the second direction (Y) at right angles to the first direction (X). The second common electrode 15 is formed to be spaced apart from the first split electrodes 14 and 14a on the upper surface of the dielectric film 11 in the first direction (X), and the second split electrodes 16 are spaced apart from the second common electrode 15 on the upper surface of the dielectric film 11 in the first direction (X) and are formed to be spaced apart from each other in the second direction (Y) at right angles to the first direction (X). The first fuse parts 17 are respectively formed between the first common electrode 13 and the first split electrodes 14 and 14a so that electric current flowing in and out through the electrode head part 12 flows to the first common electrode 13 and the first split electrodes 14 and 14a. The second fuse parts 18 are formed between the first split electrodes 14 and 14a and the second common electrode 15 so that electric current flowing in and out through the first common electrode 13 flows to the first split electrodes 14 and 14a and the second common electrode 15. The third fuse parts 19 are formed between the second common electrode 15 and the second split electrodes 16 so that electric current flowing in and out through the first split electrodes 14 and 14a flows to the second common electrode 15 and the second split electrodes 16.

The structure of the electrode forming film 10 will be described in detail.

As shown in FIG. 1, the dielectric film 11 is longer in the second direction (Y) than the first direction (X), and is made of one selected from polypropylene, polyethylene terephalate polyester (PETP), polyphenylene sulfide (PPS), polyethylene naphthalate (PEN), polyether imide (PEI) and polycarbonate (PC). Here, the first direction (X) is the longitudinal direction of the dielectric film 11, and the second direction (Y) is the width direction of the dielectric film 11.

The electrode head part 12 has a plurality of position decision mark grooves 12a which are formed to be spaced apart from each other in the second direction (Y). The position decision mark grooves 12a are spaced apart from each other on the upper surface of the electrode head part 12 in the second direction (Y) to form a shape of '⊢' and are formed of a metallic material, such as aluminum and copper, so that a thickness (T1) is larger than a thickness (T2) of the first common electrode 13, the second common electrode 15, the first split electrodes 14 and 14a, the second split electrodes 16, the first fuse parts 17, the second fuse parts 18 and the third fuse parts 19 which have the same thickness (T2) so as to enhance characteristics of equivalent series resistance. Here, as shown in FIG. 1, the thickness (T2) is shown just on the first common electrode 13, but the second common electrode 15, the first split electrodes 14 and 14a, the second split electrodes 16, the first fuse parts 17, the second fuse parts 18 and the third fuse parts 19 also has the same thickness (T2).

As shown in FIGS. 1 and 2, at least one first common electrode 13 and at least one second common electrode 15 are disposed and arranged to be spaced apart from each other on the upper surface of the dielectric film 11 in the second direction (Y). The at least one first common electrode 13 and the at least one second common electrode 15 are made of a metallic material, such as aluminum or copper.

The first common electrode 13 is connected with four to twelve first split electrodes 14 and 14a by four to twelve first fuse parts 17 at an end of the other side thereof, and the second common electrode 15 is connected with four to twelve first split electrodes 14 and 14a by four to twelve second fuse parts 18 at an end of one side thereof and are connected with four to twelve second split electrodes 16 by four to twelve third fuse parts 19 at an end of the other side thereof.

For instance, as shown in FIG. 2, the first common electrode 13 is connected with the six first fuse parts 17 at the end of the other side thereof, and the six first fuse parts 17 are connected with the first split electrodes 14 and 14a so that six first split electrodes 14 and 14a are connected to the end of the other side thereof by a middle part of the six first fuse parts 17. The second common electrode 15 is connected with three or six first split electrodes 14 and 14a by three or six second fuse parts 18 at the end of one side thereof and is connected with three or six second split electrodes 16 by three or six third fuse parts 19 at the end of the other side thereof. As described above, the electrode forming film 10 according to the present invention has at least one second common electrode 15 between the first split electrodes 14 and 14a and the second split electrodes 16 so as to easily emit heat generated from the middle part of the electrode forming film 10 which generates the most heat due to concentration of electric currents, thereby enhancing heat-resisting characteristics of the electrode forming film 10.

Figure 3:
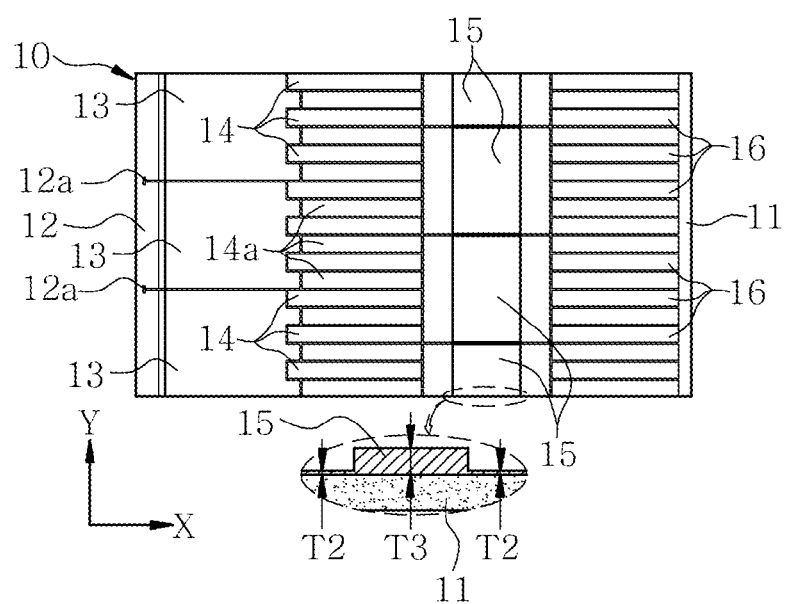
FIG. 3 is a plan view of an electrode forming film according to another preferred embodiment of the present invention.

As shown in FIG. 1, the at least one second common electrode 15 is formed to have the same thickness (T2) as the first common electrode 13. As shown in FIG. 3, in another preferred embodiment of the present invention, at least one second common electrode 15 is formed in such a way that the thickness (T2) at one side and the other side is equal to the thickness (T2) of the first common electrode 13 and the thickness (T3) of the middle part at one side and the other side is larger than the thickness (T2) of the first common electrode 13, thereby enhancing equivalent series resistance characteristics of the middle part where electric currents are concentrated and enhancing electrical characteristics of the electrode forming film 10.

As shown in FIG. 2, the first split electrodes 14 and 14a and the second split electrodes 16 are formed to have a surface area which is smaller than a surface area of the first common electrode 13 or the second common electrode 15 and the surface area is calculated by multiplication of lengths (M1, M2, L1 and L2) of the first direction (X) of the first split electrodes 14 and 14a, the second split electrodes 16, the first common electrode 13 and the second common electrode 15 by lengths (N1, N2, N3, W1 and W2) of the second direction (Y) of them. That is, the surface areas of the first split electrodes 14 and 14a and the second split electrodes 16 are respectively calculated by multiplication of the lengths (L1, L2 and L3) of the first direction (X) and the lengths (W1 and W2) of the second direction (Y), wherein the length (L1) is larger than the length (L2) and the length (L3) is equal to one of the lengths (L1 and L2). The surface areas of the first common electrode 13 and the second common electrode 15 are calculated by multiplication of the lengths (M1 and M2) of the first direction (X) by the lengths (N1, N2 and N3) of the second direction (Y) of the first common electrode 13 and the second common electrode 15, wherein the length (M1) is applied when the minimum area of the first common electrode 13 is calculated, the length (N1) is the same as the length (N2) and the length (N2) is larger than the length (N3).

As shown in FIG. 2, the first split electrodes 14 and 14a include two to twelve first major axis split electrodes 14 and two to twelve first minor axis split electrodes 14a. The two to twelve first major axis split electrodes 14 and the two to twelve first minor axis split electrodes 14a are arranged in the second direction (Y) in turns and have the same length in the second direction (Y), and the length of the first direction (X) is formed in such a way that the length (L1) of the first direction (X) of the first major axis split electrode 14 is larger than the length (L2) of the first direction (X) of the first minor axis split electrode 14a.

As shown in FIG. 2, the two to twelve first major axis split electrodes 14 and the two tow twelve first minor axis split electrodes 14a are arranged in such a way that the ends of the other side are aligned in a row in the second direction (Y) so that the ends of one side are at cross to each other. That is, because the ends of the other side of the first major split electrodes 14 and the first minor split electrodes 14a are arranged to be at cross to each other, the first fuse parts 17 connected to the ends of the one side of the first major split electrodes 14 and the first minor axis split electrodes 14a are arranged to be at cross to each other, and hence, evaporated substances generated by operation of the electrodes are bonded to the neighboring first fuse parts 17, thereby preventing abnormal operation of the first fuse parts 17.

Figure 4:
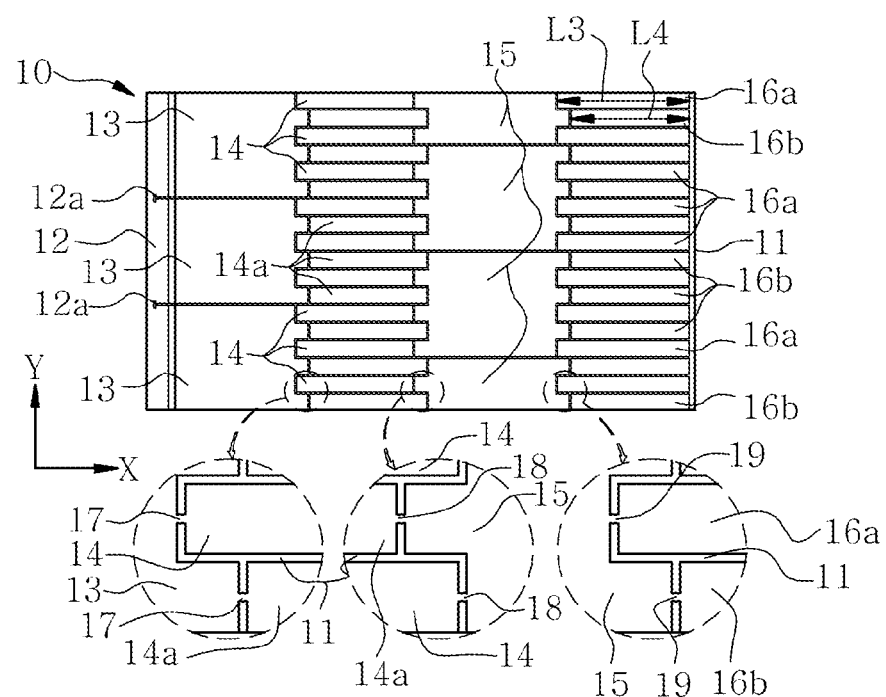
FIG. 4 is a plan view of an electrode forming film according to a further preferred embodiment of the present invention.

As shown in FIG. 4, the two to twelve first major split electrodes 14 and the two to twelve first minor split electrodes 14a are arranged to coincide with each other at the center of the first direction (X) so that the ends of one side and the ends of the other side are arranged to be at cross to each other in the second direction (Y). That is, because the ends of one side and the ends of the other side of the first major axis split electrodes 14 and the first minor axis split electrodes 14a are arranged to be at cross to each other, the first fuse parts 17 and the second fuse parts 18 which are respectively connected to the ends of one side and the ends of the other side of the first major axis split electrodes 14 and the first minor axis split electrodes 14a are arranged to be at cross to each other, so that evaporated substances generated by operation of the electrodes 14 and 14a are bonded to the neighboring first fuse parts 17 or second fuse parts 17, thereby preventing abnormal operation of the first fuse parts 17 and the second fuse parts 18.

As shown in FIG. 2, the second split electrodes 16 are formed in such a way that the length (L3) of the first direction (X) and the length (W1) of the second direction (Y) are formed to be equal to each other. FIG. 4 illustrates another example of the second split electrodes 16. The second split electrodes 16 illustrated in FIG. 4 include two to twelve second major axis split electrodes 16a and two to twelve second minor axis split electrodes 16b.

The two to twelve second major axis split electrodes 16a and the two to twelve second minor axis split electrodes 16b are arranged in turns in the second direction (Y) and have the same length (W1 shown in FIG. 2) of the second direction (Y) and the lengths (L3 and L4) of the first direction (X) are formed in such a way that the length (L3) of the first direction (X) of the second major axis split electrodes 16a is larger than the length (L4) of the first direction (X) of the second minor axis split electrode 16b, and as shown in FIG. 4, the second fuse parts 18 and the third fuse parts 19 are arranged in such a way that ends of the one side are arranged in a row in the second direction (Y) and ends of the other side are arranged to be at cross to each other, thereby preventing that evaporated substances generated by operation of the second fuse parts 18 or the third fuse parts 19 are bonded to the second fuse parts 18 or the third fuse parts 19.

Figure 5:
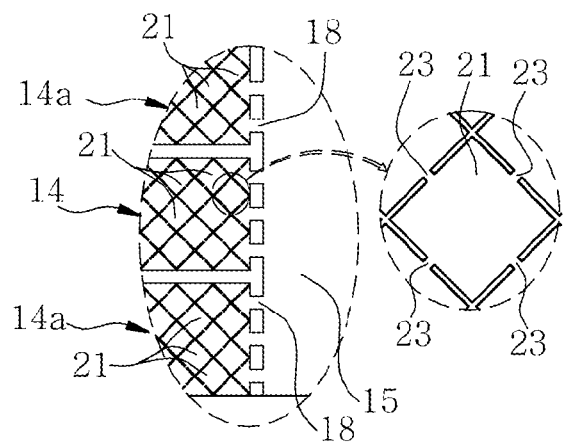
FIGS. 5 and 6 are plan views showing another example of a first split electrode shown in FIG. 2.
Figure 6:
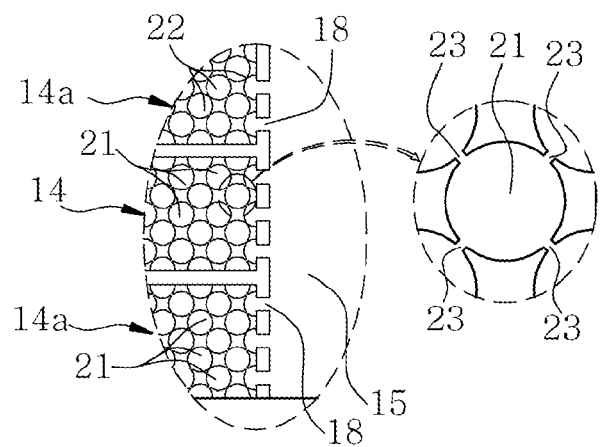

FIGS. 5 and 6 illustrate other examples of the first split electrodes 14 and 14a. As shown in FIGS. 5 and 6, the first split electrodes 14 and 14a have a plurality of diamond patterns 21 or circular patterns 22 therein, and the diamond patterns 21 or the circular patterns 22 are formed to be connected with each other by at least two auxiliary fuse parts 23. Like the first split electrodes 14 and 14a, the second split electrodes 16 also have the diamond patterns 21 or the circular patterns 22 therein as shown in FIGS. 5 and 6, and the diamond patterns 21 or the circular patterns 22 are formed to be connected with each other by at least two auxiliary fuse parts 23.

Figure 7:
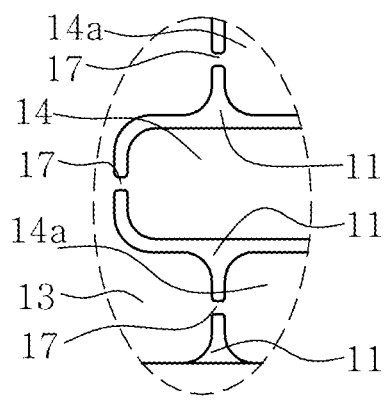
FIGS. 7 to 9 are plant views showing further examples of split electrodes and fuse parts shown in FIG. 2.
Figure 8:
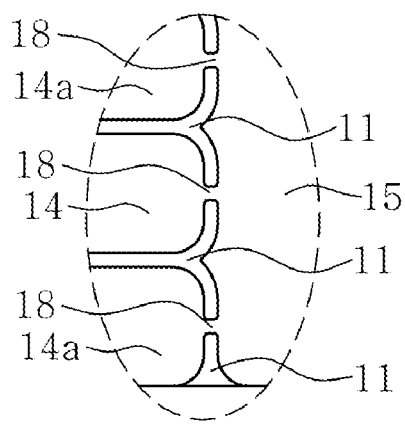
Figure 9:
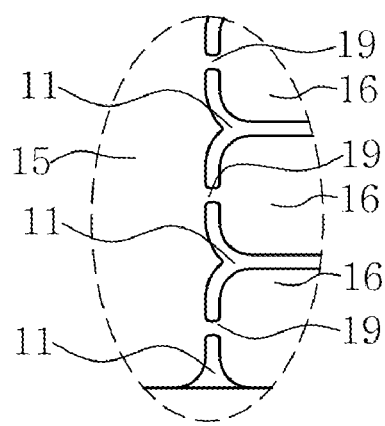

FIGS. 7 to 9 illustrate further examples of the first split electrodes 14 and 14a, the second split electrodes 16, the first fuse parts 17, the second fuse parts 18 and the third fuse parts 19. As shown in FIGS. 7 to 9, the first split electrodes 14 and 14a, the second split electrodes 16, the first fuse parts 17, the second fuse parts 18 and the third fuse parts 19 are formed in a rectangular shape from which edges are removed to prevent that an electric field is concentrated on the edge portions by edge currents. Here, the first fuse parts 17, the second fuse parts 18 and the third fuse parts 19 are evaporated and come down by overcurrent, so that the electrode forming film 10 according to the present invention can be operated in stability even though overcurrent is generated.

Figure 10:
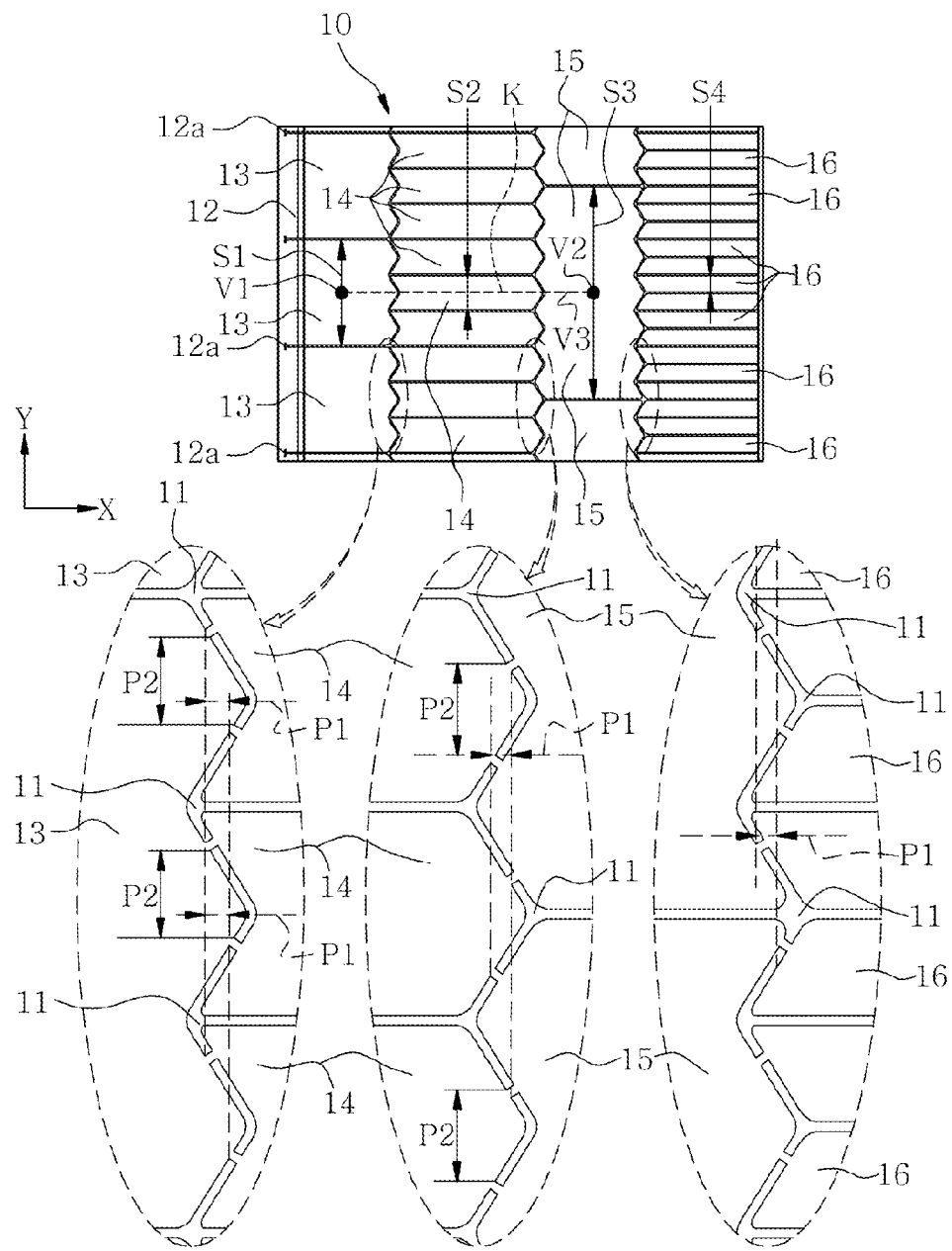
FIG. 10 is a plan view of an electrode forming film according to a still further preferred embodiment of the present invention.

FIG. 10 illustrates an electrode forming film 10 according to another preferred embodiment of the present invention. The electrode forming film 10 includes a dielectric film 11, an electrode head part 12, a first common electrode 13, a plurality of first split electrodes 14 and 14*a*, a second common electrode 15, a plurality of second split electrodes 16, a plurality of first fuse parts 17, a plurality of second fuse parts 18 and a plurality of third fuse parts 19.

The dielectric film 11, the electrode head part 12, the first common electrode 13, the first split electrodes 14 and 14*a*, the second common electrode 15, the second split electrodes 16, the first fuse parts 17, the second fuse parts 18 and the third fuse parts 19 of this preferred embodiment are the same as those of the electrode forming film according to the previously described preferred embodiment of the present invention. However, in this embodiment, the electrode forming film 10 is different 19 from the electrode forming film according to the previously described preferred embodiment of the present invention, in the outward appearance and arrangement intervals of the first common electrode 13, the first split electrodes 14 and 14*a*, the second common electrode 15, the second split electrodes 16, the first fuse parts 17, the second fuse parts 18 and the third fuse parts.

Referring to FIG. 10, just differences between the electrode forming film 10 according to this preferred embodiment and the electrode forming film 10 according to the previously described embodiment will be described.

A plurality of the first common electrodes 13 are formed to be spaced apart from each other on the upper surface of the dielectric film 11, and, in the second direction (Y), the width direction length (S1) of the electrode forming film 10 is shorter than the length (S3) of the second direction (Y) of the second common electrodes 16, and in the first direction (X), the width direction lengths of the electrode forming film 10 are equal to each other or different from each other.

As shown in FIG. 10, the first common electrodes 13 are formed in a shape of '|' at an end of one side and in a shape of '>' at ends of the other side, and the '>'-shaped ends of the other side are connected with each other in the second direction (Y). Such first common electrodes 13 are connected in a state where the first fuse parts 17 are spaced apart from each other at predetermined intervals (P1 and P2) in the first direction (X) and the second direction (Y) at ends of the other side. For instance, the first common electrodes 13 are formed in such a way that two first fuse parts 17 are connected to the ends of the '>'-shaped first common electrode 13, and the two first fuse parts 17 are formed to be at cross to each other by being spaced apart from each other at predetermined intervals (P1 and P2) in the first direction (X) and the second direction (Y).

As shown in FIG. 10, the first split electrodes 14 is formed in such a way that the length (S2) of the second direction (Y) is smaller than the length (S3) of the second direction (Y) of the first common electrode 13 or larger than the length (S4) of the second direction (Y) of the second split electrodes 16, and ends of one side and the other side of each first split electrode 14 is formed in a '>' shaped. That is, the ends of one side and the other side of the first split electrodes 14 are formed in a shape of '>', and two first fuse parts 17 of the first fuse parts 17 are connected to the '>'-shaped ends of one side to be spaced apart from each other in the first direction (X) and the second direction (Y). Moreover, two first fuse parts 17 of the first fuse parts 17 are connected to the '>'-shaped ends of the other sides to be spaced apart from each other in the first direction (X) and the second direction (Y). Additionally, the first fuse parts 17 and the second fuse parts 18 are spaced apart from each other at predetermined intervals (P1 and P2) in the first direction (X) and the second direction (Y) so as to be respectively connected to ends of the first split electrodes 14.

As shown in FIG. 10, the second common electrode 15 is formed in such a way that the length (S3) of the second direction (Y) is larger than the length (S1) of the second direction (Y) of the first common electrode 13, and '>'-shaped ends of one side and the other side of the second common electrode 15 are formed to be connected with each other in the second direction (Y). That is, the second common electrodes 5 are formed in such a way that '>'-shaped ends are formed at one side and the other side to be connected with each other in the second direction (Y). The second fuse parts 18 are connected to ends of one side of the second common electrodes 15 to be spaced apart from each other in the first direction (X) and the second direction (Y), and the third fuse parts 19 are connected to ends of the other side of the second common electrodes 15 to be spaced apart from each other in the first direction (X) and the second direction (Y). For instance, the second common electrodes 15 are formed in such a way that two second fuse parts 18 are spaced apart from each other at the interval (P1 and P2) in the first direction (X) and in the second direction (Y) at the '>'-shaped ends of one end thereof, and the two third fuse parts 19 are connected to the '>'-shaped ends of the other side to be spaced apart from each other at the intervals (P1 and P2) in the first direction (X) and the second direction (Y). The second common electrodes 15 and the first common electrodes 13 are formed on the upper surface of the dielectric film 11 in the first direction (X) that the middle points (V1 and V2) of the second direction lengths of the second common electrode 15 and the first common electrode 13 are at right angles to the second direction (Y), namely, a straight line (V3).

As shown in FIG. 10, the second split electrodes 16 are formed in such a way that the length (S4) of the second direction (Y) is smaller than the length (S2) of the second direction (Y) of the first split electrodes 14 and 14*a* has a slash-shaped end or a backslash-shaped end of one side and a '|'-shaped end of the other side. The slash-shaped or backslash-shaped end is connected with an end of one side of one third fuse part 19 of the third fuse parts 19. For instance, the second split electrodes 16 is formed in such a way that one third fuse part 19 is connected to the slash-shaped or backslash-shaped end of one side, and the third fuse parts 19 which are respectively connected to the second split electrodes 16 are formed to be spaced apart from each other at the intervals (P1) in the first direction (X).

In the electrode forming film 10 according to a further preferred embodiment of the present invention, the first common electrode 13, the first split electrodes 14 and 14*a*, the second common electrode 15, the second split electrodes 16, the first fuse parts 17, the second fuse parts 18 and the third fuse parts 19 are respectively formed in a plate shape from which edges are removed, and the lengths of the second direction (Y) of the first split electrodes 14, the second common electrode 15 and the second split electrodes 16 are equal to each other or different from each other. In the electrode forming film 10 according to another preferred embodiment of the present invention, the length (S3) of the second common electrode 15 is larger than the length (S1) of the second direction (Y) of the first common electrode 13, the length (S4) of the second direction (Y) of the second split electrodes 16 is smaller than the length (S2) of the second direction (Y) of the first split electrodes (14), and the first to third fuse parts 17, 18 and 19 are connected to the '>'-shaped ends of one side or the other side, thereby increasing capacity due to even distribution of current density and enhancing characteristics of equivalent series resistance due to the even distribution of the whole current density.

The first common electrode 13, the first split electrodes 14, the second common electrode 15 and the second split electrodes 16 respectively use segment electrodes, and the segment electrodes are different in length (S1, S2, S3 and S4) of the second direction (Y) and in area of the upper surface from each other.

For instance, the length (S1) of the second direction (Y) of the first common electrode (13) is smaller than the length (S3) of the second direction (Y) of the second common electrode 15, but is larger than the length (S2) of the second direction (Y) of the first split electrode (14), and the length (S4) of the second direction (Y) of the second split electrode 16 is smaller than the length (S2) of the second direction (Y) of the first split electrode 14. The lengths of the first direction (X) of the electrodes 13, 14, 15 and 16 are set in such a way that the area of the first common electrode 13 is smaller than that of the second common electrode 15, but is greater than that of the first split electrodes 14 and the area of the second split electrodes 16 is smaller than that of the first split electrodes 14. That is, the areas of the segment electrodes are arranged at different positions on the upper surface of the dielectric film 11 in such a way that the area of the first common electrode 13 is smaller than that of the second common electrode 15, but larger than that of the first split electrodes 14, and the area of the second split electrodes 16 is smaller than that of the first split electrodes 14, thereby maintaining security and reducing resistance of the electrode forming film 10 to minimize heat generation when a load is applied.

Referring to the attached drawings, a configuration of a film capacitor using the electrode forming film 10 according to the present invention will be described as follows.

Figure 11:
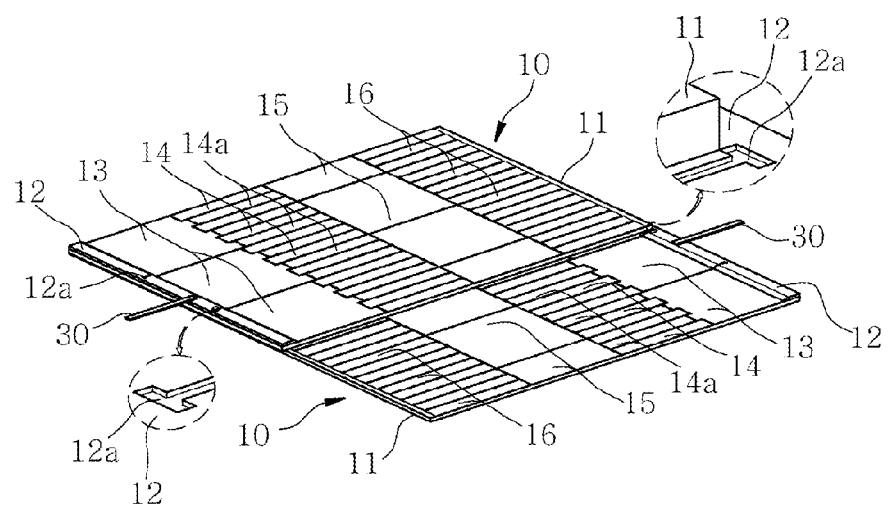
FIG. 11 is a perspective view of a film capacitor using the electrode forming film according to the present invention.

As shown in FIG. 11, the film capacitor using the electrode forming film 10 includes at least two electrode forming films 10 and a pair of external electrodes 30.

Each of the at least two electrode forming films 10 includes a dielectric film 11, electrode head parts 12, a first common electrode 13, a plurality of first split electrodes 14 and 14a, a second common electrode 15, a plurality of second split electrodes 16, a plurality of first fuse parts 17, a plurality of second fuse parts 18 and a plurality of third fuse parts 19. Description of the electrode forming film 10 will be omitted because the electrode forming film 10 is identical to the previously described electrode forming film 10. The electrode head parts 12 are respectively located at one side and the other side of the electrode forming film 10 to be at cross to each other, the first common electrode 13 and the second split electrodes 16 are piled one on another, and the second common electrode 15 and the first split electrodes 14 and 14a are piled one on another.

A pair of external electrodes 30 are respectively connected with the electrode head parts 12 of the at least two electrode forming films 10. That is, one of the external electrodes 30 is connected with the electrode head part 12 located at one side of the electrode forming film 10 and the other one is connected with the electrode head part 12 located at the other side of the electrode forming film 10 so as to make electric current flow in and out through the electrode forming film 10. The electrode head part 12 provides a plurality of '⊢'-shaped position decision mark grooves 12a for aligning the electrode forming films 10 when the at least two electrode forming films 10 are piled one on another. For instance, as shown in FIG. 11, when the two electrode forming films 10 are piled one on another to be overlapped, they are aligned on the '⊢'-shaped position decision mark grooves 12a formed on the upper surface of the electrode head parts 12 so that a user can easily laminate the electrode forming films 10.

As described above, the electrode forming film and the film capacitor using the electrode forming film according to the present invention can minimize reduction of capacity due to operation of the fuse parts. Moreover, because the fuse parts are arranged to be at cross to each other, the electrode forming film and the film capacitor using the electrode forming film according to the present invention can prevent that the fuse part influences on the neighboring fuse part and the fuse parts are operated abnormally when the fuse parts are operated and evaporated.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An electrode forming film comprising:
   a dielectric film;
   an electrode head part formed on an upper surface of the dielectric film;
   a first common electrode formed on the upper surface of the dielectric film to be connected with the electrode head part;
   a plurality of first split electrodes which are spaced apart from the first common electrode on the upper surface of the dielectric film in a first direction and are spaced apart from each other in a second direction at right angle to the first direction;
   a second common electrode formed to be spaced apart from the first split electrodes on the upper surface of the dielectric film in the first direction;
   a plurality of second split electrodes which are spaced apart from the second common electrode on the upper surface of the dielectric film in the first direction and are spaced apart from each other in the second direction;
   a plurality of first fuse parts which are formed between the first common electrode and the first split electrodes to make electric current, which flows in and out through the electrode head part, flow to the first common electrode and the first split electrodes;
   a plurality of second fuse parts which are formed between the first split electrodes and the second common electrode to make electric current, which flows into and out of the first common electrode flow to the first split electrodes and the second common electrode; and
   a plurality of third fuse parts which are formed between the second common electrode and the second split electrodes to make electric current, which flows into and out of the first split electrodes flow to the second common electrode and the second split electrodes, wherein the electrode head part includes a plurality of position decision mark grooves which are formed on the upper surface thereof to be spaced apart from each other in the second direction.

2. The electrode forming film according to claim 1, wherein the dielectric film is longer in the second direction which is a width direction of the dielectric film than the first direction which is a length direction of the dielectric film, and is made of one selected from the group consisting of polypropylene, polyethylene terephalate polyester (PETP), polyphenylene sulfide (PPS), polyethylene naphthalate (PEN), polyether imide (PEI) and polycarbonate (PC).

3. The electrode forming film according to claim 1, wherein the plurality of position decision mark grooves is formed in a shape of 'ㅏ', and is formed of a metallic material to have a thickness, which is larger than a thickness of the first common electrode, the second common electrode, the first split electrodes, the second split electrodes, the first fuse parts, the second fuse parts and the third fuse parts which have a same thickness.

4. The electrode forming film according to claim 1, wherein the first common electrode and the second common electrode are respectively at least one, and the first common electrode is connected with four to twelve first split electrodes by four to twelve first fuse parts at an end of the other side thereof, and the second common electrode is connected with four to twelve first split electrodes by four to twelve second fuse parts at an end of one side thereof and are connected with four to twelve second split electrodes by the four to twelve third fuse parts at an end of the other side thereof.

5. The electrode forming film according to claim 4, wherein the at least one first common electrode and the at least one second common electrode are formed of a metallic material, and the at least one second common electrode is formed to have the same thickness as the first common electrode or thicknesses of one side and the other side are the same as the at least one first common electrode, and the thickness of the middle part at the one side and the other side is larger than the thickness of the at least one first common electrode.

6. The electrode forming film according to claim 1, wherein the first split electrodes and the second split electrodes are formed to have a surface area which is smaller than a surface area of the first common electrode or the second common electrode and the surface area is calculated by multiplication of first direction lengths of the first split electrodes, the second split electrodes, the first common electrode and the second common electrode by second direction lengths thereof.

7. The electrode forming film according to claim 1, wherein the first split electrodes include two to twelve first major axis split electrodes and two to twelve first minor axis split electrodes, wherein the two to twelve first major axis split electrodes and the two to twelve first minor axis split electrodes are arranged in the second direction in turns and have a same length in the second direction, and a length of the first direction is formed in such a way that the length of the first direction of the first major axis split electrode is larger than the length of the first direction of the first minor axis split electrode.

8. The electrode forming film according to claim 7, wherein the two to twelve first major axis split electrodes and the two to twelve first minor axis split electrodes are arranged in such a way that the ends of the other side are aligned in a row in the second direction so that the ends of one side are at cross to each other.

9. The electrode forming film according to claim 7, wherein the two to twelve first major axis split electrodes and the two to twelve first minor axis split electrodes are arranged to coincide with each other at the center of the first direction so that the ends of one side and the ends of the other side are arranged to be at cross to each other in the second direction.

10. The electrode forming film according to claim 1, wherein the second split electrodes are formed in such a way that a length of the first direction and a length of the second direction are formed to be equal to each other.

11. The electrode forming film according to claim 1, wherein the second split electrodes include two to twelve second major axis split electrodes and two to twelve second minor axis split electrodes, wherein the two to twelve second major axis split electrodes and the two to twelve second minor axis split electrodes are arranged in the second direction in turns and have a same length in the second direction, a length of the first direction is formed in such a way that the length of the first direction of the second major axis split electrode is larger than the length of the first direction of the second minor axis split electrode, and they are arranged in such a way that ends of the other side are aligned in a row in the second direction so that the ends of one side are at cross to each other.

12. The electrode forming film according to claim 1, wherein the first split electrodes have a plurality of diamond patterns or circular patterns therein, and the diamond patterns or the circular patterns are formed to be connected with each other by at least two auxiliary fuse parts.

13. The electrode forming film according to claim 1, wherein the first split electrodes, the second split electrodes, the first fuse parts, the second fuse parts and the third fuse parts are formed in a rectangular shape from which edges are removed.

14. The electrode forming film according to claim 1, wherein the first common electrode and the second common electrode are respectively at least one, and the at least one first common electrode and the at least one second common electrode are arranged on the upper surface of the dielectric film to be spaced apart from each other in the second direction.

15. An electrode forming film comprising:
a dielectric film;
an electrode head part formed on an upper surface of the dielectric film;
a first common electrode formed on the upper surface of the dielectric film to be connected with the electrode head part;
a plurality of first split electrodes which are spaced apart from the first common electrode on the upper surface of the dielectric film in a first direction and are spaced apart from each other in a second direction at right angle to the first direction;
a second common electrode formed to be spaced apart from the first split electrodes on the upper surface of the dielectric film in the first direction;
a plurality of second split electrodes which are spaced apart from the second common electrode on the upper surface of the dielectric film in the first direction and are spaced apart from each other in the second direction;
a plurality of first fuse parts which are formed between the first common electrode and the first split electrodes to make electric current, which flows in and out through the electrode head part, flow to the first common electrode and the first split electrodes;

a plurality of second fuse parts which are formed between the first split electrodes and the second common electrode to make electric current, which flows into and out of the first common electrode flow to the first split electrodes and the second common electrode; and a plurality of third fuse parts which are formed between the second common electrode and the second split electrodes to make electric current, which flows into and out of the first split electrodes flow to the second common electrode and the second split electrodes, wherein a second direction length of the second common electrode is larger than a second direction length of the first common electrode, the second direction length of each of the first split electrodes is smaller than the second direction length of the first common electrode, the second direction length of each of the second split electrodes is smaller than the second direction length of the first split electrode, and the second direction lengths of the first split electrodes, the second common electrode and the second split electrodes are different from each other, and wherein the first common electrode and the second common electrode are formed on the upper surface of the dielectric film so that a middle point of the second direction length becomes perpendicular to the first direction at right angle to the second direction, wherein the first common electrodes are formed in a shape of '|' at an end of one side and in a shape of '>' at ends of the other side in such a way that the '>'-shaped ends of the other side are connected with each other in the second direction, and the first fuse parts are connected to the ends of the other side to be spaced apart from each other in the second direction and in the first direction, wherein the first split electrodes are formed in a shape of '>' at ends of one side and the other side thereof, two of the first fuse parts are connected to the '>'-shaped ends of one side to be spaced apart from each other in the first direction and the second direction, and two of the first fuse parts are connected to the '>'-shaped ends of the other side to be spaced apart from each other in the first direction and the second direction, wherein the second common electrodes are formed in such a way that '>'-shaped ends are formed at one side and the other side to be connected with each other in the second direction, the second fuse parts are connected to the ends of one side to be spaced apart from each other in the first direction and the second direction, and the third fuse parts are connected to the ends of the other side to be spaced apart from each other in the first direction and the second direction, and wherein the second split electrodes are formed in a slash shape or in a backslash shape at ends of one side and one of the third fuse parts is connected to the ends of the one side.

16. The electrode forming film according to claim 15, wherein the second direction length of the first common electrode is smaller than the second direction length of the second common electrode but is larger than the second direction length of the first split electrode, the second direction length of the second split electrode is smaller than the second direction length of the first split electrode, the first direction lengths of the first common electrode, the second common electrode, the first split electrodes and the second split electrodes are set in such a way that the area of the first common electrode is smaller than that of the second common electrode but is greater than that of the first split electrodes and the area of the second split electrodes is smaller than that of the first split electrodes.

17. A film capacitor comprising:

at least two electrode forming films each of which includes a dielectric film on which an electrode head part, a first common electrode, a plurality of first split electrodes, a second common electrode, a plurality of second split electrodes, a plurality of first fuse parts, a plurality of second fuse parts and a plurality of third fuse parts are arranged on the upper surface thereof to be spaced apart from each other; and a pair of external electrodes each of which is connected with the electrode head part of the electrode forming film, wherein the electrode head parts of the at least two electrode forming films are located at one side and the other side to be at cross to each other, the first common electrode and the second split electrodes are piled one on another and the second common electrode and the first split electrodes are piled one on another to be overlapped, one of the external electrodes is connected with the electrode head part located at one side of the electrode forming film and the other one is connected with the electrode head part located at the other side of the electrode forming film, wherein the at least two electrode forming films are aligned on '┼'-shaped position decision mark grooves formed on an upper surface of the electrode head part when they are piled one on another to be overlapped.

18. The film capacitor according to claim 17, wherein each of the at least two electrode forming films comprises:

a dielectric film;

an electrode head part formed on an upper surface of the dielectric film;

a first common electrode formed on the upper surface of the dielectric film to be connected with the electrode head part;

a plurality of first split electrodes which are spaced apart from the first common electrode on the upper surface of the dielectric film in a first direction and are spaced apart from each other in a second direction at right angles to the first direction;

a second common electrode formed to be spaced apart from the first split electrodes on the upper surface of the dielectric film in the first direction;

a plurality of second split electrodes which are spaced apart from the second common electrode on the upper surface of the dielectric film in the first direction and are spaced apart from each other in the second direction;

a plurality of first fuse parts which are formed between the first common electrode and the first split electrodes to make electric current, which flows in and out through the electrode head part, flow to the first common electrode and the first split electrodes;

a plurality of second fuse parts which are formed between the first split electrodes and the second common electrode to make electric current, which flows into and out of the first common electrode flow to the first split electrodes and the second common electrode; and a plurality of third fuse parts which are formed between the second common electrode and the second split electrodes to make electric current, which flows into and out of the first split electrodes flow to the second common electrode and the second split electrodes.

* * * * *